United States Patent
Albrecht et al.

(10) Patent No.: US 7,948,701 B2
(45) Date of Patent: May 24, 2011

(54) SERVO PATTERNS FOR SELF-ASSEMBLED ISLAND ARRAYS

(75) Inventors: Thomas R. Albrecht, San Jose, CA (US); Zvonimir Z. Bandic, San Jose, CA (US); Xiao Z. Wu, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 0 days.

(21) Appl. No.: 12/627,621

(22) Filed: Nov. 30, 2009

(65) Prior Publication Data

US 2010/0073819 A1    Mar. 25, 2010

Related U.S. Application Data

(62) Division of application No. 11/964,661, filed on Dec. 26, 2007, now Pat. No. 7,643,234.

(51) Int. Cl.
     *G11B 5/09*    (2006.01)
     *G11B 21/02*    (2006.01)
     *G11B 5/596*    (2006.01)

(52) U.S. Cl. .......... 360/48; 360/77.08; 360/75
(58) Field of Classification Search ........ None
See application file for complete search history.

(56) References Cited

U.S. PATENT DOCUMENTS

| | | | |
|---|---|---|---|
| 7,106,544 B2 * | 9/2006 | Dugas et al. | 360/75 |
| 7,643,234 B2 * | 1/2010 | Albrecht et al. | 360/48 |
| 2006/0280975 A1 * | 12/2006 | Albrecht et al. | 428/848.5 |
| 2007/0258161 A1 * | 11/2007 | Richter et al. | 360/48 |
| 2008/0002295 A1 * | 1/2008 | Sakurai et al. | 360/131 |
| 2010/0128583 A1 * | 5/2010 | Albrecht et al. | 369/47.14 |

* cited by examiner

*Primary Examiner* — Andrew L Sniezek
(74) *Attorney, Agent, or Firm* — Duft Bornsen & Fishman, LLP

(57) ABSTRACT

Servo patterns and associated methods of fabricating servo patterns are described. For patterned storage media, data sectors and servo sectors may be patterned using self-assembly. In one embodiment, self-assembly is used to form a first array of islands and a second array of islands in servo sectors that are track-wise offset. A servo writing process is then performed to write a desired servo pattern in the arrays, such as for burst fields, synchronization fields, etc.

4 Claims, 12 Drawing Sheets

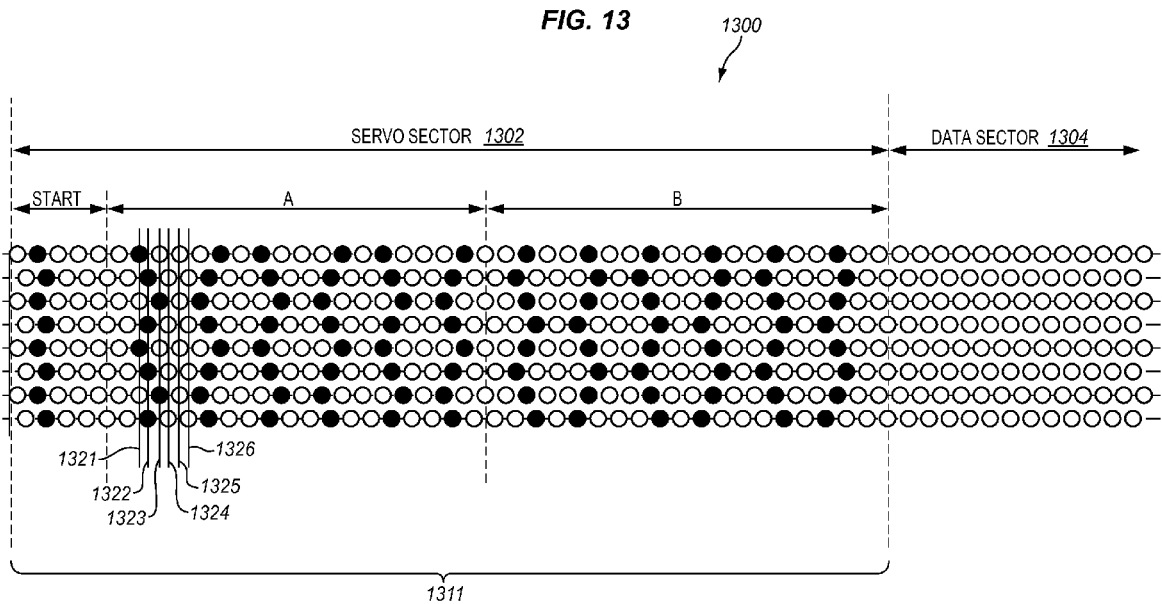

SERVO PATTERNS FOR SELF-ASSEMBLED ISLAND ARRAYS

RELATED APPLICATIONS

The patent application is a divisional of U.S. patent application having the Ser. No. 11/964,661, and filed on Dec. 26, 2007 now U.S. Pat. No. 7,643,234, which is incorporated by reference herein.

BACKGROUND OF THE INVENTION

1. Field of the Invention

The invention is related to the field of magnetic disk drive systems and, in particular, to patterned magnetic media and associated methods of fabrication. More particularly, the fabrication of patterned magnetic media is performed to define servo patterns in one or more arrays of islands that are formed using self-assembly materials.

2. Statement of the Problem

Many computer systems use magnetic disk drives for mass storage of information. Magnetic disk drives typically include one or more sliders that include a read/write head. A suspension arm holds the slider above a magnetic disk. When the magnetic disk rotates, an air flow generated by the rotation of the magnetic disk causes an air bearing surface (ABS) side of the slider to ride a particular height above the magnetic disk. The height depends on the shape of the ABS. As the slider rides on the air bearing, an actuator moves the suspension arm to position the read/write head over selected tracks of the magnetic disk.

A conventional magnetic disk is divided into data regions and servo regions. The data regions are comprised of a plurality of data sectors where actual data is stored. In the data regions, the magnetic surface of the disk is divided into small magnetic regions, each of which is used to encode a single binary unit of information. The magnetic regions include a few hundred magnetic grains forming a magnetic dipole which generates a highly localized magnetic field. The read/write head magnetizes a magnetic region by generating a strong local magnetic field to store a bit of data.

The servo regions are comprised of a plurality of servo sectors that are used to assist in reading and writing to the data sectors, such as by positioning the read/write head over the center of tracks, deriving a synchronization signal, etc. When data recording is performed on a magnetic disk, the read/write head is positioned over the tracks based on a positioning signal (Positioning Error Signal (PES)) that is read from the servo sectors on the disk. The servo sectors include burst fields that are used to guide the read/write head to the proper position on the disk. There are typically four servo burst fields (also referred to as a quadrature burst) that are defined in the servo sectors. The servo burst fields are typically offset from one another in relation to the center of one or more tracks on the magnetic disk. Thus, depending on where the read/write head is positioned (i.e., center track or off track), the read/write head will read different signals from the servo burst fields. The resultant signals read from the servo burst fields are then processed, and a determination is made as to how far the read/write head is offset from the center of the track. Appropriate positional correction of the read/write head may then be performed. The servo sectors may also include synchronization fields, Automatic Gain Control (AGC) fields, and other fields.

As the areal density of the magnetic disk increases, the super-paramagnetic effect causes problems for disk manufacturers. The super-paramagnetic effect occurs when the microscopic magnetic grains on the disk become so tiny that ambient temperature can reverse their magnetic orientations. The result is that the bit is erased and the data is lost.

One solution to the problems posed by the super-paramagnetic effect is to pattern the magnetic disk. A patterned magnetic disk is created as an ordered array of discrete magnetic islands, with each island capable of storing an individual bit. Because each island represents an individual magnetic domain, the patterned magnetic disk is thermally stable and higher densities may be achieved.

One method used to pattern a magnetic disk is with self-assembly materials. Self-assembly materials are known as materials that uniformly order themselves due to their inherent properties. For entities (molecules, macromolecules, etc) interacting with potentials having cylindrical or spherical symmetry, hexagonal close packed (HCP) ordering is the most common ordering that is achieved with self-assembly. Self-assembly works best when the entire surface area of interest is completely covered.

There are problems encountered when fabricating patterned media with self-assembly materials. In data sectors, the islands of the patterned media should be uniformly spaced. The precise locations and sizes of the islands are important to the signal-to-noise ratio (SNR) and the Bit Error Rate (BER) of the data recording process. Also, to increase the areal density of the disk, the spacing and size of the islands have to be small. Self-assembly thus works well to form the data patterns as a well-ordered array of islands, such as an array having HCP ordering.

By contrast, the servo patterns in the burst fields and synchronization fields in the servo sectors do not conform easily to HCP ordering or other simple arrays, and some patterns rely on the existence of empty spaces in the pattern. Such servo patterns are difficult to achieve with self-assembly. Thus, it is a problem to pattern servo regions using self-assembly.

SUMMARY

Embodiments of the invention solve the above and other related problems by defining servo patterns in one or more arrays of islands in servo sectors that are formed through self-assembly. Even though the arrays of islands in the servo sectors are highly ordered, such as HCP ordering, the servo patterns described herein provide the desired positioning signals, synchronization signals, etc. As a result, both the data sectors and the servo sectors may be patterned using self-assembly.

One embodiment of the invention comprises a method of fabricating servo sectors of a patterned storage media that is formed with self-assembly. One step of the method comprises forming a first array of discrete islands in a servo sector using self-assembly, where the islands in the first array have HCP ordering. The first array defines at least two burst fields. Another step of the method comprises forming a second array of discrete islands in the servo sector using self-assembly, where the islands in the second array have HCP ordering. The second array also defines at least two burst fields. The second array is formed with a track-wise offset (i.e., an offset in the radial direction) from the first array. The offset between the first array and the second array may be about a half track offset, but the amount of offset between the arrays may vary depending on design preferences. Another step of the method comprises performing a servo writing process to define the polarity of the islands in the arrays. The servo writing process is performed by circumferentially writing one or more rows of islands to define the servo pattern in the servo sector. The servo pattern may be burst fields, sync fields, etc.

For instance, assume that the first array of islands defines first and second burst fields, and the second array of islands defines third and fourth burst fields. In a first row of the second array, the servo write process writes an alternating polarity in consecutive islands in the third burst field, and writes a uniform polarity in consecutive islands in the fourth burst field. In a first row of the first array, the servo write process then writes a uniform polarity in consecutive islands in the first burst field, and writes an alternating polarity in consecutive islands in the second burst field. In a second row of the second array, the servo write process writes a uniform polarity in consecutive islands in the third burst field, and writes an alternating polarity in consecutive islands in the fourth burst field. In a second row of the first array, the servo write process writes an alternating polarity in consecutive islands in the first burst field, and writes a uniform polarity in consecutive islands in the second burst field. This process of writing to consecutive rows is repeated to define the desired servo pattern. The servo pattern generated by the servo writing process allows a quadrature signal to be generated when a read/write head passes over a track of the patterned storage media.

Another embodiment of the invention comprises forming interruption regions in the boundaries between the offset arrays of islands described above.

Another embodiment of the invention comprises another method of fabricating servo sectors of a patterned storage media that is formed with self-assembly. One step of the method comprises forming an array of discrete islands in a servo sector using self-assembly. The islands in the array have HCP ordering, and the array defines at least two burst fields. Another step of the method comprises performing a servo writing process to define the polarity of the islands in the array.

For instance, assume that the array of islands defines first, second, third, and fourth burst fields. In a first row of the array, the servo write process writes a uniform polarity in consecutive islands in the first burst field, writes an alternating polarity in consecutive islands in the second burst field, writes a uniform polarity in consecutive islands in the third burst field, and writes an alternating polarity in consecutive islands in the fourth burst field. In the second row of the array, the servo write process writes an alternating polarity in consecutive islands in the first burst field, writes a uniform polarity in consecutive islands in the second burst field, writes a uniform polarity in consecutive islands in the third burst field, and writes an alternating polarity in consecutive islands in the fourth burst field. In the third row of the array, the servo write process writes an alternating polarity in consecutive islands in the first burst field, writes an alternating polarity in consecutive islands in the second burst field, writes a uniform polarity in consecutive islands in the third burst field, and writes a uniform polarity in consecutive islands in the fourth burst field. In the fourth row of the array, the servo write process writes a uniform polarity in consecutive islands in the first burst field, writes an alternating polarity in consecutive islands in the second burst field, writes an alternating polarity in consecutive islands in the third burst field, and writes a uniform polarity in consecutive islands in the fourth burst field. This process of writing to consecutive rows is repeated to define the desired servo pattern. The servo pattern generated by the servo writing process also allows a quadrature signal to be generated when a read/write head passes over a track of the patterned storage media.

Other embodiments describe methods of patterning synchronization fields, Automatic Gain Control (AGC) fields, and start fields in servo sectors that are fabricated using self-assembly. The invention may include other exemplary embodiments described below.

DESCRIPTION OF THE DRAWINGS

The same reference number represents the same element or same type of element on all drawings.

FIG. 13 is a top view of a patterned storage media in an exemplary embodiment of the invention.

DETAILED DESCRIPTION OF THE INVENTION

FIGS. 1-13 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
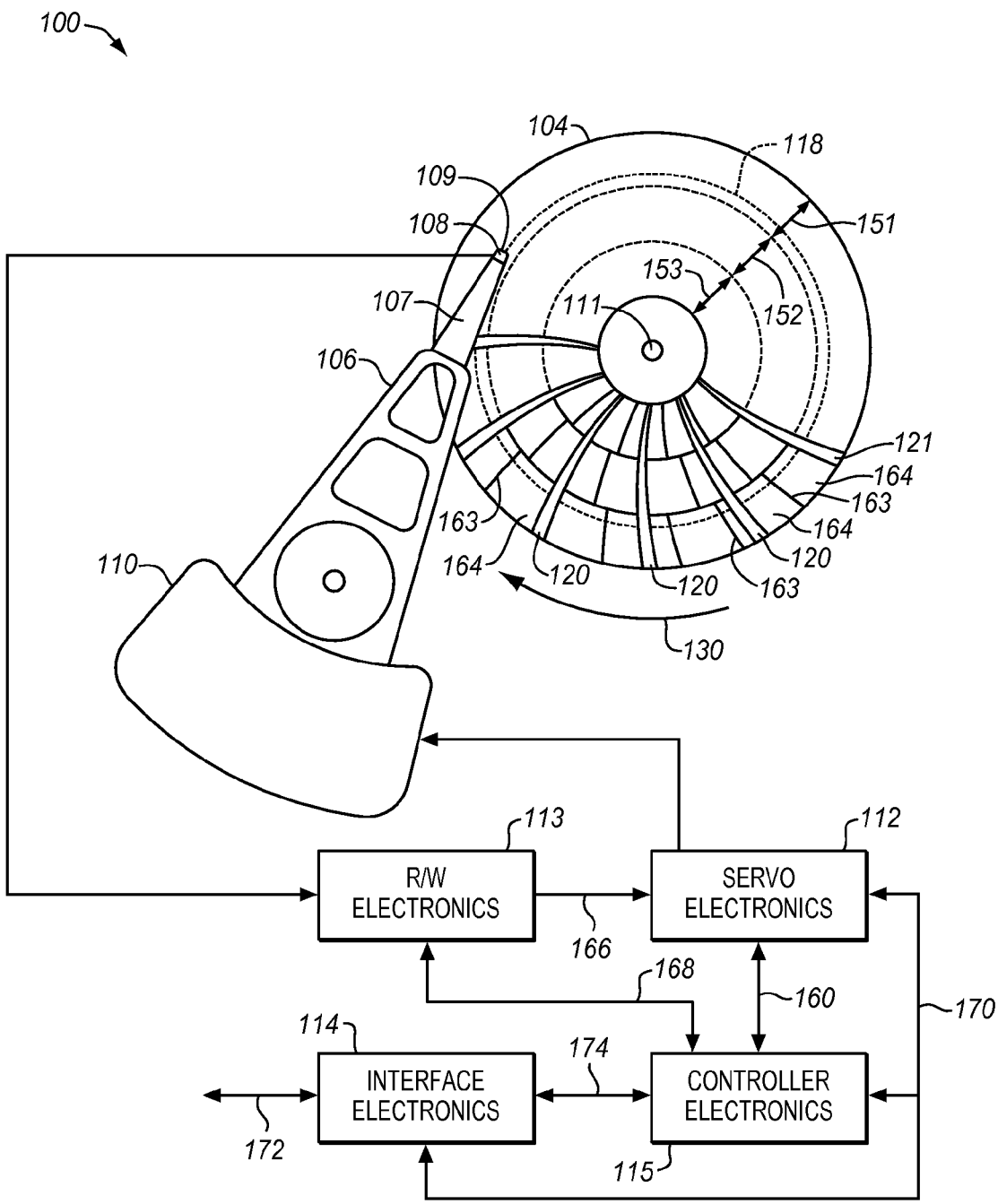
FIG. 1 is a schematic of a conventional magnetic disk drive system.

FIG. 1 is a schematic of a conventional magnetic disk drive system 100. Disk drive system 100 includes a magnetic recording disk 104, a voice coil motor (VCM) actuator 110, an actuator arm 106, a suspension 107, a slider 108, and a read/write head 109. Read/write head 109 is typically a combination of an inductive write head and a magnetoresistive read head that is located on the trailing end or end face of slider 108. Slider 108 is supported on the actuator arm 106 by a suspension 107 that enables the slider to "pitch" and "roll" on an air-bearing generated by the disk 104 as it rotates in the direction of arrow 130. Only one disk surface with an associated slider and read/write head is shown in FIG. 1, but there are typically multiple disks stacked on a hub that is rotated by a spindle motor, with a separate slider and read/write head associated with each surface of each disk.

Disk 104 has a center of rotation 111 and is rotated in direction 130. Disk 104 has a magnetic recording layer with radially-spaced concentric data tracks, one of which is shown as track 118. Each data track has a reference index 121 indicating the start-of-track. Disk drive system 100 is illustrated as a zone-bit-recording (ZBR) disk drive because the data tracks are grouped radially into a number of annular data zones, three of which are shown as zones 151, 152, and 153, but the invention is fully applicable to a disk drive that does not use ZBR, in which case disk drive system 100 would have only a single data zone. Within each zone, the tracks are also circumferentially divided into a number of data sectors, such as typical data sectors 164 in the radially outer data zone. Each data sector 164 is preceded by a synchronization (sync) field, such as typical sync fields 163. The sync fields 163 are detectable by the read/write head 109 for enabling synchronization of reading and writing the data bits in the data sectors 164. In conventional disk drives, a sync field is a non-data region on the disk that is magnetized each time data is written in its associated data sector.

Each data track also includes a plurality of circumferentially or angularly-spaced servo sectors 120 that include positioning information detectable by the read/write head 109 for moving the read/write head 109 to desired data tracks and maintaining the read/write head 109 on the data tracks. The servo sectors 120 in each track are aligned circumferentially with the servo sectors 120 in the other tracks so that they extend across the tracks in a generally radial direction, as represented by radially-directed servo sectors 120. The servo sectors 120 are non-data regions on the disk that are magnetized once in a servo writing process typically during manufacturing or formatting of the disk 104, and are not intended to be erased during normal operation of disk drive system 100.

The electronics associated with disk drive system 100 include read/write (R/W) electronics 113, servo electronics 112, controller electronics 115, and interface electronics 114. In the operation of disk drive system 100, the R/W electronics 113 receive signals from read/write head 109 and passes servo information from the servo sectors 120 to servo electronics 112 and data signals from the data sectors 164 to controller electronics 115. Servo electronics 112 uses the servo information to generate a current that drives VCM actuator 110 to position read/write head 109. Interface electronics 114 communicates with a host system (not shown) over interface 172, passing data and command information. Interface electronics 114 also communicates with controller electronics 115 over interface 174. In the operation of disk drive system 100, interface electronics 114 receives a request for reading from or writing to the data sectors 164 over interface 172. Controller electronics 115 receives a list of requested data sectors from interface electronics 114 and converts them into a set of numbers that uniquely identify the disk surface, track, and data sector. The numbers are passed to servo electronics 112 to enable positioning read/write head 109 to the appropriate data sector.

Conventional magnetic disk drive systems use disks with continuous media, meaning that the magnetic recording layer is a continuous film of magnetizable material. In conventional continuous-media disks, the concentric data tracks are not physically separated from one another and are not pre-formed in the recording layer, but are formed when the write fields from the read/write head 109 create the magnetizations in the continuous magnetic layer. A continuous-media disk may also be a "discrete-track" disk, meaning that the concentric data tracks of continuous magnetic material are radially separated from one another by concentric nonmagnetic guard bands. In a discrete-track disk, the nonmagnetic guard bands may be trenches or grooves, or formed of nonmagnetic material, or contain magnetic material but have surfaces far enough below the surfaces of the data tracks to not adversely the readback signals from the data tracks.

However, magnetic recording disks with "patterned" media have been proposed to increase the data density. In patterned media, the magnetizable material on the disk is patterned into small discrete islands such that there is a single magnetic domain in each island or "bit". The single magnetic domains can be a single grain or consist of a few strongly coupled grains that switch magnetic states in concert as a single magnetic volume. This is in contrast to conventional continuous media wherein a single "bit" may have multiple magnetic domains separated by domain walls. To produce the required magnetic isolation of the patterned islands, the magnetic moment of the spaces between the islands are destroyed or substantially reduced so as to render these spaces essentially nonmagnetic.

Figure 2:
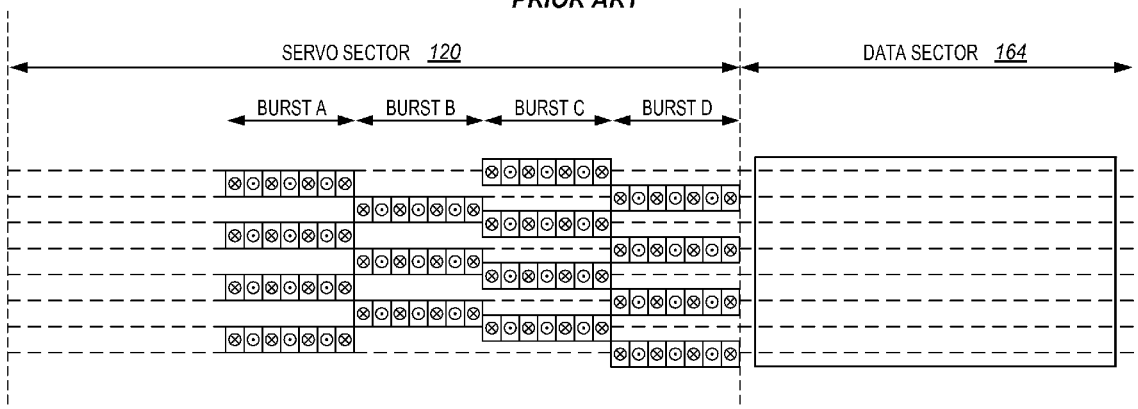
FIG. 2 illustrates exemplary patterns of a servo sector and a data sector.
Figure 3:
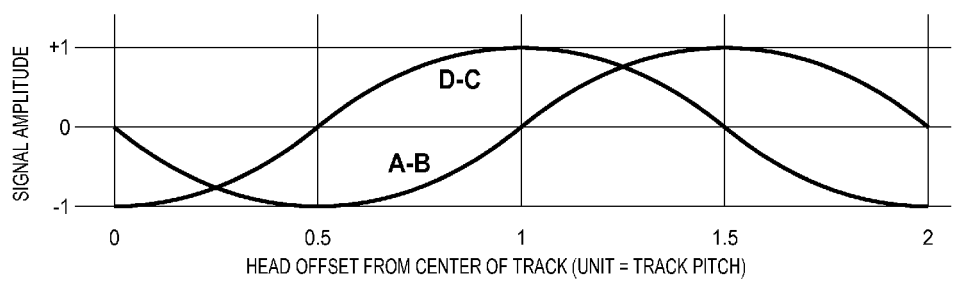
FIG. 3 is a graph illustrating the signals read from a servo sector.

FIG. 2 illustrates exemplary patterns of a servo sector 120 and a data sector 164. Servo sector 120 may include a plurality of burst fields (A-D). The horizontal dotted lines in FIG. 2 illustrate tracks of magnetic recording disk 104. The regions with an arrow point in FIG. 2 represent one polarity of magnetization, while the regions with an arrow tail represent an opposite polarity. Those skilled in the art will appreciate that data sector 164 will have complex magnetization patterns utilizing both polarities. As the read/write head 109 in slider 108 (see FIG. 1) traverses the servo pattern, the amplitude of the various offset bursts A through D will vary in amplitude, depending on the lateral position of the center of read/write head 109 with respect to the center of the track. For example, if read/write head 109 is centered on the second track illustrated in FIG. 2, then the amplitude of response from bursts A and B will be equal. FIG. 3 is a graph illustrating the signals read from servo sector 120. Thus, the net amplitude of A-B is around zero. At the same time, the amplitude of response from burst D will be larger than the amplitude of response from burst C. Thus, the net amplitude of D-C is a positive value (non-zero). This indicates that the read/write head 109 is centered on the track.

As previously stated, it is a problem to pattern servo sectors using self-assembly because self-assembly creates a highly-ordered pattern. FIGS. 4, 7, 10, and 12 describe methods of fabricating servo sectors of patterned storage media that is formed with self-assembly. Based on the methods described herein, desired servo patterns may be written into the highly-ordered array of islands created through self-assembly to provide positioning signals, synchronization signals, etc.

Figure 4:
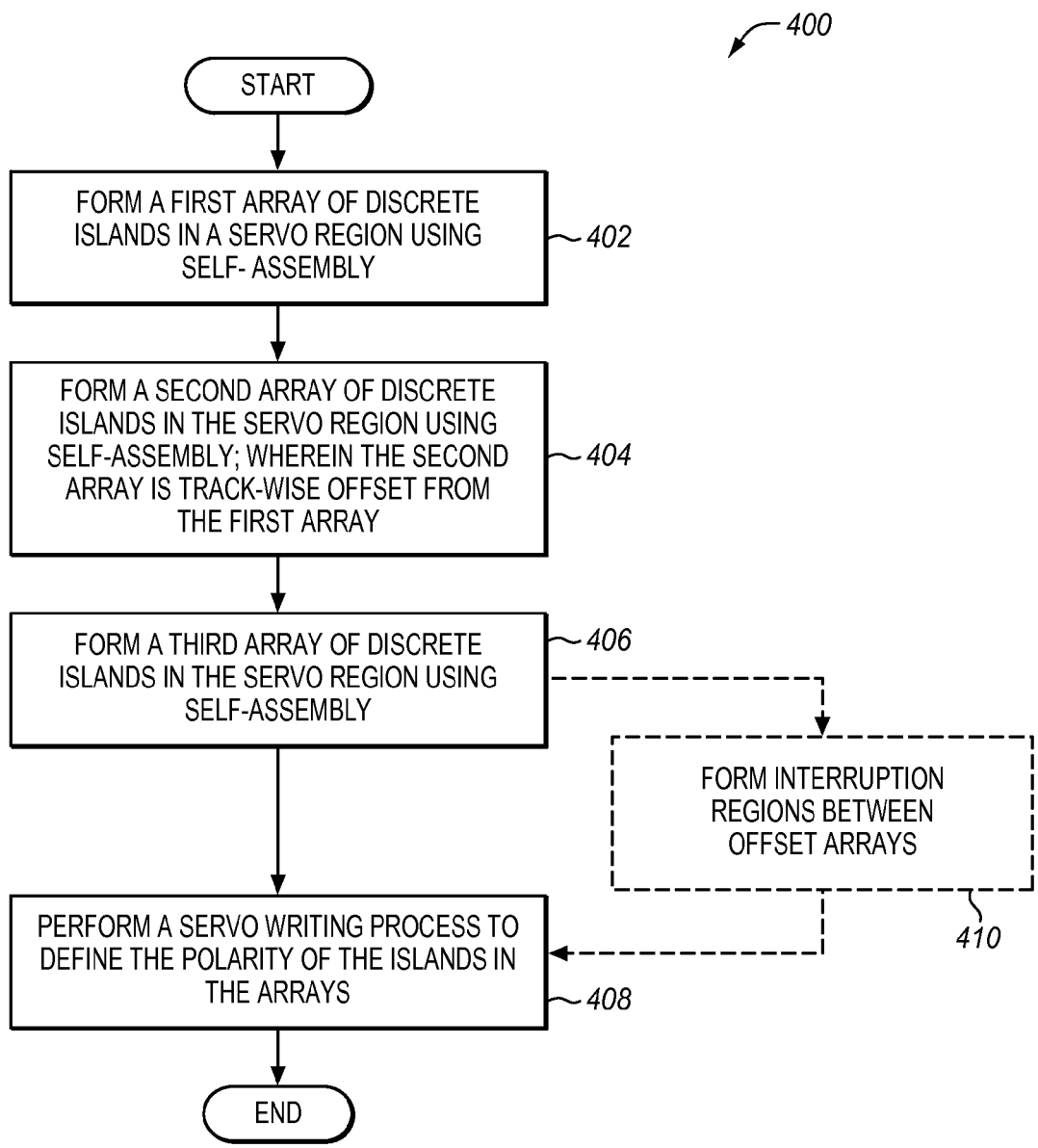
FIG. 4 is a flow chart illustrating a method of fabricating servo sectors of a patterned storage media that is formed with self-assembly in an exemplary embodiment of the invention.

FIG. 4 is a flow chart illustrating a method 400 of fabricating servo sectors of a patterned storage media that is formed with self-assembly in an exemplary embodiment of the invention. Method 400 may be used to fabricate magnetic recording disk 104 as shown in FIG. 1, or may be used to fabricate other types of storage media, such as optical media. Although one servo sector is described below, those skilled in the art will appreciate that similar steps may be performed to fabricate multiple servo sectors on a patterned storage media.

Figure 5:
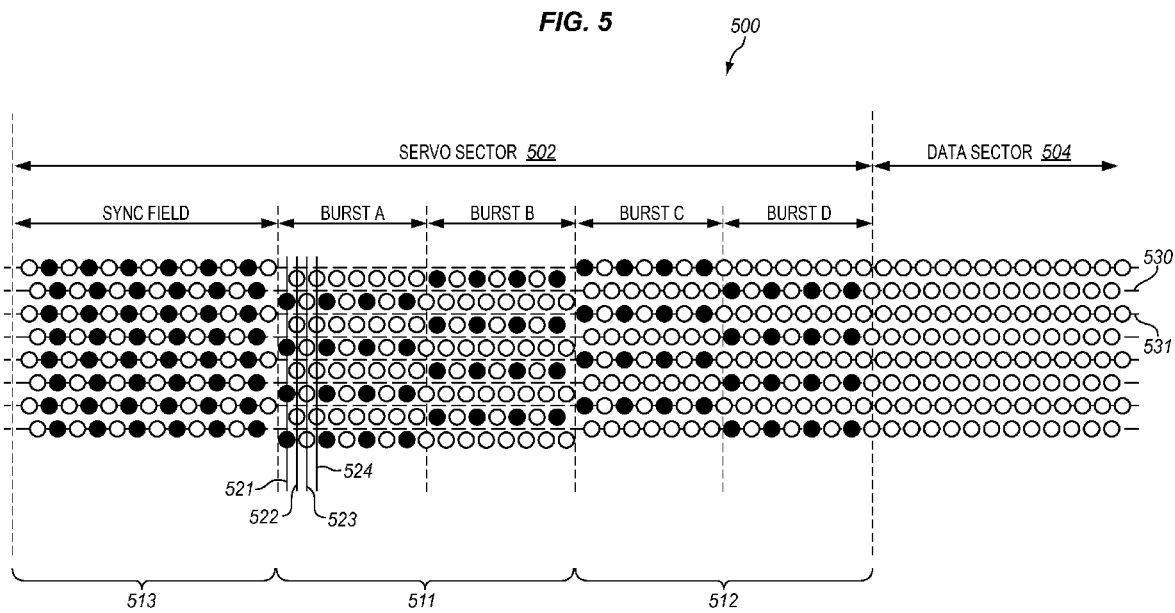
FIG. 5 is a top view of a patterned storage media in an exemplary embodiment of the invention.

Step 402 comprises forming a first array 511 of discrete islands in a servo sector 502 using self-assembly (see FIG. 5). FIG. 5 is a top view of a patterned storage media 500 in an exemplary embodiment of the invention. Patterned storage media 500 has a first array 511 of islands in servo sector 502. Array 511 comprises eight rows of islands that are highly ordered, such as an HCP ordering formed through self-assembly (although other ordering may be achieved). Although eight rows are shown, those skilled in the art will appreciate that array 511 may include many more rows of islands. Array 511 may define one or more burst fields, such as burst fields A and B as illustrated in FIG. 5. Patterned storage media 500 also includes a data sector 504 that is shown to illustrate the highly ordered array of islands in data sector 504 that was also formed with self-assembly.

Step 404 comprises forming a second array 512 of discrete islands in servo sector 502 using self-assembly (see FIG. 5). Array 512 also comprises eight rows of islands that are highly ordered (e.g., HCP ordering), although array 512 may also include many more rows of islands. Array 512 may define one or more burst fields, such as burst fields C and D as illustrated in FIG. 5. The burst fields (A-D) illustrated in FIG. 5 are used to generate a Positioning Error Signal (PES) when read by a read/write head to position the read/write head over the center of a track. Those skilled in the art will appreciate that arrays 511 and 512 may be formed in the same fabrication processes.

Second array 512 is formed with a track-wise offset (i.e., an offset in the radial direction) from first array 511. The offset between first array 511 and second array 512 may be accomplished using guided self-assembly. The offset shown in FIG. 5 is about a half track offset, as the rows of second array 512 are substantially on the center of the tracks (the tracks are illustrated as horizontal dotted lines), while the rows of first array 511 are between tracks. The amount of offset between arrays 511-512 may vary depending on design preferences.

Method 400 in FIG. 4 also includes the optional step 406 of forming a third array 513 of discrete islands in servo sector 502 using self-assembly (see FIG. 5). Array 513 comprises eight rows of islands that are highly ordered (e.g., HCP ordering), although array 813 may include many more rows of islands. Array 513 defines a synchronization field and/or an Automatic Gain Control (AGC) field. A synchronization field or AGC field may be used to indicate the start of a pattern to set up timing for the capture of signals from the subsequent burst fields, to provide a reference amplitude to set the gain of a signal amplifying stage, and/or to define a reference amplitude useful in the calculation of the head position. Array 513 is most likely formed with its rows on the center of the tracks. Thus, array 513 may be track-wise offset from other arrays, such as array 511, which are formed off-track. Method 400 may include additional steps of forming other arrays of islands in servo sector 502 as desired.

After the arrays 511-512 of islands are formed, the polarities of the islands are defined to create a desired servo pattern. Step 408 of FIG. 4 comprises performing a servo writing process to define the polarity of the islands in arrays 511 and 512. The servo writing process is performed by circumferentially writing one or more rows of islands to define the servo pattern in servo sector 502. The servo pattern may be burst fields, sync fields, etc. A typical servo write process is performed by writing to the islands row-by-row. In this particular case, because rows in arrays 511 and 512 are ½ track displaced, the servo writing process is performed ½ track by ½ track. Thus, the polarities of the consecutive islands in a row are defined.

For instance, in a first row of array 512 (i.e., the top row), the servo write process writes an alternating polarity in consecutive islands in burst field C, and writes a uniform polarity in consecutive islands in burst field D. Then, in a first row of array 511 (i.e., the top row), the servo write process writes a uniform polarity (indicated by white islands) in consecutive islands in burst field A, and writes an alternating polarity (indicated by alternating black and white islands) in consecutive islands in burst field B. Then, in a second row of array 512 (i.e., the row beneath the first row), the servo write process writes a uniform polarity in consecutive islands in burst field C, and writes an alternating polarity in consecutive islands in burst field D. Then, in a second row of array 511 (i.e., the row beneath the first row), the servo write process writes an alternating polarity in consecutive islands in burst field A, and writes a uniform polarity in consecutive islands in burst field B. This process of writing to consecutive rows (going down in FIG. 5) is repeated to define the servo pattern illustrated in FIG. 5.

The HCP ordering of arrays 511-512 creates a plurality of radial columns of islands. Vertical lines 521-524 illustrate four radial columns of islands in array 511. Because of the HCP ordering, the radial columns are formed from islands in alternating rows. In other words, the radial columns are not formed from islands in consecutive rows due to the HCP ordering, but are formed from islands in every other row.

Due to the servo writing process described above, the islands of a first radial column 521 have a first polarity (indicated by black islands), and the islands of the next three radial columns 522-524 have a second polarity (indicated by white islands). This pattern in the successive radial columns is repeated in burst fields A-D (i.e., from left to right in FIG. 5). The terms "first" and "second" polarity are used to describe opposite or antiparallel polarities. For example, in perpendicular recording, a first polarity may refer to an island having a magnetization pointing out of the page of FIG. 5. A second polarity may refer to an island having a magnetization pointing into the page of FIG. 5.

One advantage to the pattern shown in FIG. 5 is that a wide write head may be used for the servo writing process. A wide write head is defined as a write head that writes to multiple rows (or tracks) simultaneously as opposed to writing to a single row. Because radial columns in this servo pattern have the same polarity, a wide write head may write to multiple rows at the same time which greatly reduces the time required for the servo writing process. For instance, the islands in radial column 521 have the same polarity (indicated by black islands), so the islands in this radial column 521 may be written simultaneously with a wide write head. Also, the islands in radial columns 522-524 have the same polarity (indicated by white islands), so the islands in these radial columns 522-524 may be written simultaneously with a wide write head. As the wide write head passes over array 511 from left to right, the write head is able to write the desired burst patterns into the radial columns.

A wide write head may be 10-20 microns wide which may simultaneously write to a radial column spanning 100 rows or more. As a result, the servo writing process may be reduced by multiple orders of magnitude over a write head that writes to only a single row at a time.

The servo pattern generated by the servo writing process advantageously allows a quadrature signal to be generated when a read/write head passes over a track of patterned storage media 500, even though servo sector 502 was patterned with self-assembly. Assume for example that a read/write head is traveling over the center of track 530. For the positioning signal read by read/write head, the amplitude of response from burst fields A and B will be equal. In a quadrature signal (A-B), the net amplitude will be zero. Similarly, the amplitude of response from burst field C will be small while the amplitude of response from burst field D will be large. In a quadrature signal (D-C), the net amplitude will be high. These responses indicate that the read/write head is on the center of track 530. If the read/write head moves upward from the center of track 530, then the amplitude of response from burst field A will be smaller, and the amplitude of response from burst field B will be larger, causing A-B to become smaller (and if the read/write head moves to the downward, A-B would become larger). In general, A-B is linearly proportional to the offset from the center of the track, close to the track center, so this signal can be used in the closed loop servo for fine positioning.

Assume for another example that a read/write head is traveling between tracks 530 and 531. For the positioning signal read by read/write head, the amplitude of response from burst field A will be large while the amplitude of response from burst field B will be small. In a quadrature signal (A-B), the net amplitude will be high. Similarly, the amplitude of response from burst fields C and D will be equal. In a quadrature signal (D-C), the net amplitude will be zero. These responses indicate that the read/write head is below the center of track 530 and needs to be adjusted.

The servo writing process in step 408 of FIG. 4 may also be performed to define the polarity of the islands in array 513 (synchronization/AGC field). To provide the desired synchronization pattern in this embodiment, the servo writing process writes an alternating polarity in the islands of each row. Due to the servo writing process, the islands of two consecutive radial columns have a first polarity (indicated by black islands), and the islands of the next two radial columns have a second polarity (indicated by white islands). This pattern is repeated in the successive radial columns in array 513.

When array 511 and 512 are offset from one another, the precision of ordering may be degraded near the boundary between the array 511 and 512. This is because the HCP ordering is lost at the boundary so that islands at the boundary are no longer captured and forced to proper position by steric interactions between the self-assembled particles. As a result, particles may be offset from their ideal locations, and the islands formed from the original particle pattern may also be offset. The effects of such offsets at the boundary may influence other particles near the boundary, giving rise to smaller offset errors for particles near but not on the boundary. To mitigate the effects of such offset islands, interruption regions may be defined at the boundaries.

Figure 6:
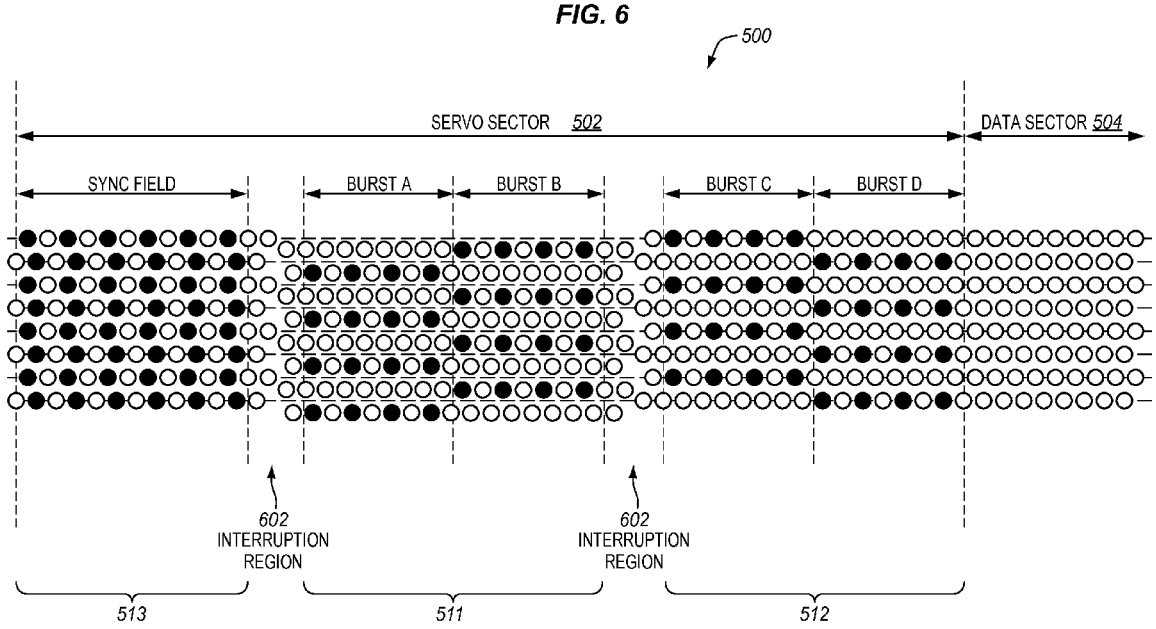
FIG. 6 is a top view of a patterned storage media with interruption regions in an exemplary embodiment of the invention.

FIG. 6 is a top view of a patterned storage media 500 with interruption regions 602 in an exemplary embodiment of the invention. Interruption regions 602 are formed at the boundary between array 513 and array 511, and at the boundary between array 511 and array 512. The islands in interruption regions 602 have the same polarity, so that the signal read from interruption regions 602 may be ignored. Interruption regions 602 may be formed in optional step 410 as shown in FIG. 4.

Figure 7:
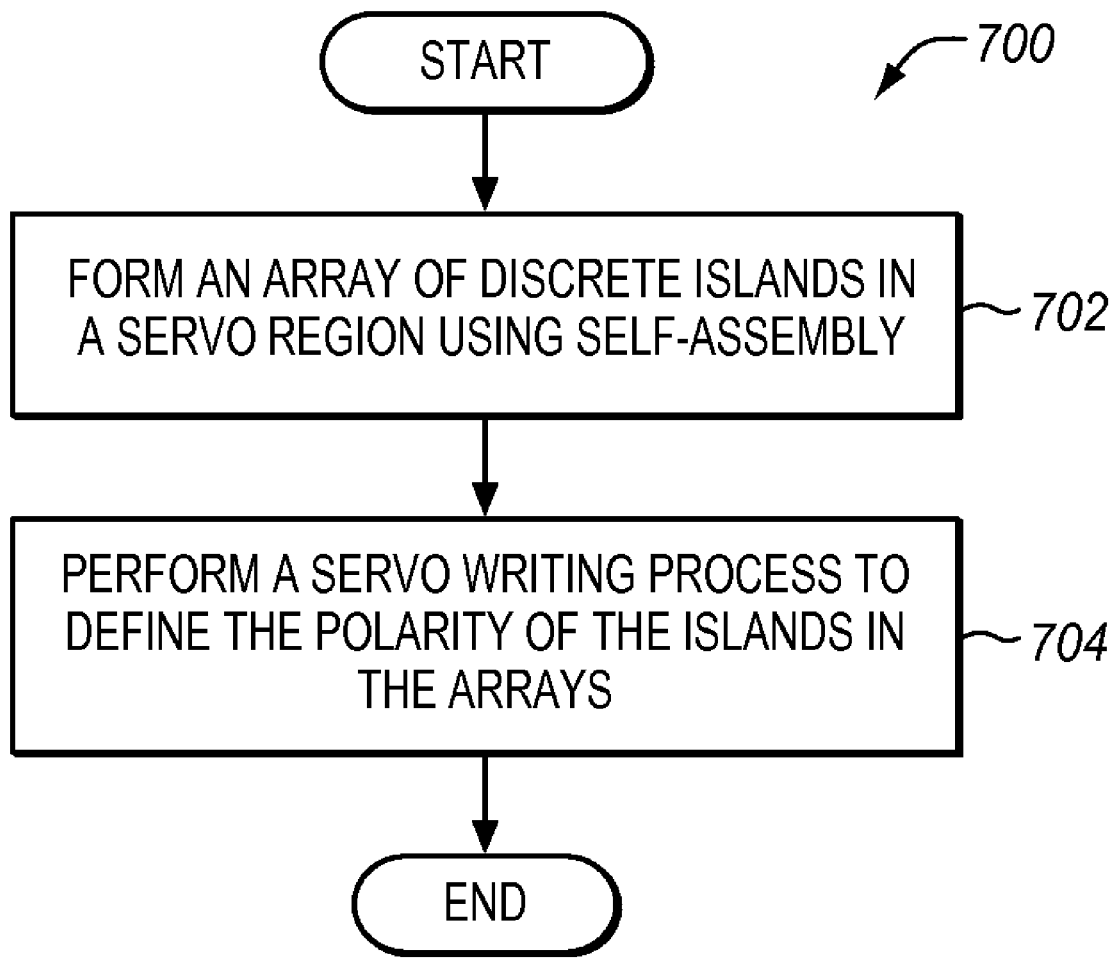
FIG. 7 is a flow chart illustrating another method of fabricating servo sectors of a patterned storage media that is formed with self-assembly in an exemplary embodiment of the invention.

The above embodiment shows a servo pattern formed in offset arrays 511-512. Another embodiment described in FIGS. 7-8 allows for a servo pattern to be formed in an array that is not offset. FIG. 7 is a flow chart illustrating another method 700 of fabricating servo sectors of a patterned storage media that is formed with self-assembly in an exemplary embodiment of the invention. Although one servo sector is described below, those skilled in the art will appreciate that similar steps may be performed to fabricate multiple servo sectors on a patterned storage media.

Figure 8:
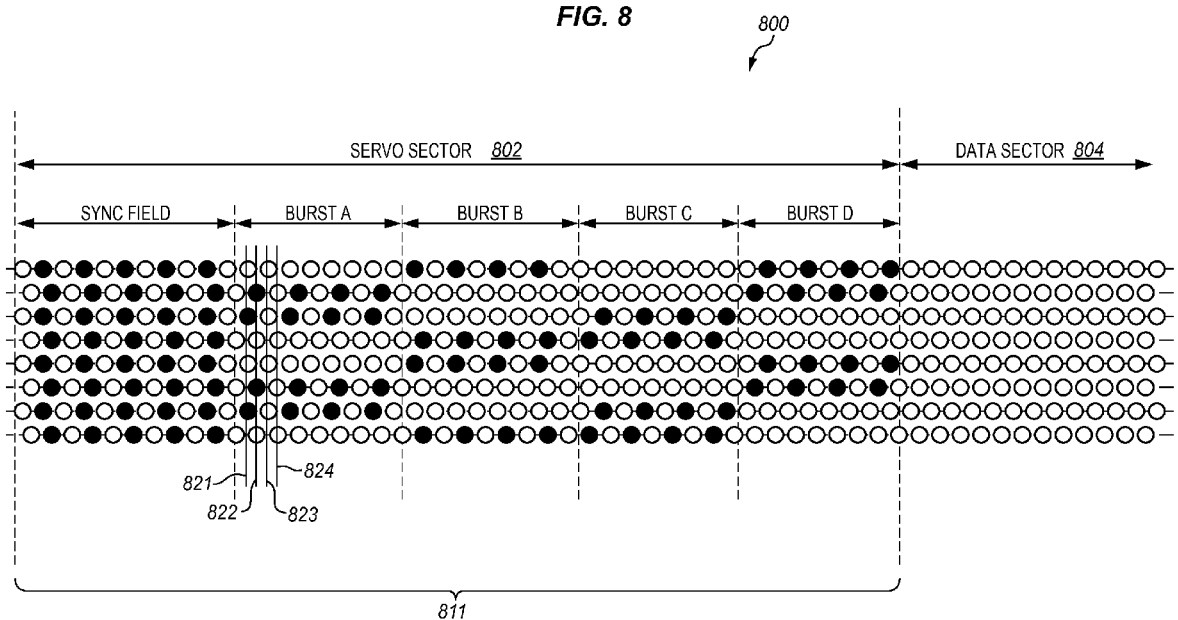
FIG. 8 is a top view of a patterned storage media in an exemplary embodiment of the invention.

Step 702 comprises forming an array 811 of discrete islands in a servo sector 802 using self-assembly (see FIG. 8). FIG. 8 is a top view of a patterned storage media 800 in an exemplary embodiment of the invention. Patterned storage media 800 has an array 811 of islands in servo sector 802. Array 811 comprises eight rows of islands that are highly ordered (e.g., HCP ordering), although array 811 may include many more rows of islands. Array 811 may define one or more burst fields, such as burst fields A-D as illustrated in FIG. 8. Array 811 may also define a synchronization field and/or an AGC field. Patterned storage media 800 also includes a data sector 804 that is shown to illustrate the highly ordered array of islands in data sector 804 that was also formed with self-assembly.

After the arrays 511-512 of islands are formed, the polarities of the islands are defined to create a desired servo pattern. Step 704 of FIG. 7 comprises performing a servo writing process to define the polarity of the islands in array 811. The servo writing process is performed by circumferentially writing a row of islands to define the servo pattern in servo sector 802. For instance, in the first row on FIG. 8 (i.e., the top row), the servo write process writes a uniform polarity in consecutive islands in burst field A, writes an alternating polarity in consecutive islands in burst field B, writes a uniform polarity in consecutive islands in burst field C, and writes an alternating polarity in consecutive islands in burst field D. In the second row on FIG. 8, the servo write process writes an alternating polarity in consecutive islands in burst field A, writes a uniform polarity in consecutive islands in burst field B, writes a uniform polarity in consecutive islands in burst field C, and writes an alternating polarity in consecutive islands in burst field D. In the third row on FIG. 8, the servo write process writes an alternating polarity in consecutive islands in burst field A, writes a uniform polarity in consecutive islands in burst field B, writes an alternating polarity in consecutive islands in burst field C, and writes a uniform polarity in consecutive islands in burst field D. In the fourth row on FIG. 8, the servo write process writes a uniform polarity in consecutive islands in burst field A, writes an alternating polarity in consecutive islands in burst field B, writes an alternating polarity in consecutive islands in burst field C, and writes a uniform polarity in consecutive islands in burst field D. This process of writing to consecutive rows (going down in FIG. 8) is repeated to define the servo pattern illustrated in FIG. 8.

The HCP ordering of array 811 again creates a plurality of radial columns of islands. Vertical lines 821-824 illustrate four radial columns of islands in array 811. Due to the servo writing process described above, the islands of a first radial column 821 have an alternating polarity (i.e., alternating between a first polarity and a second polarity), the islands of a second radial column 822 have an alternating polarity, and the islands of the next two radial columns 823-824 have a uniform polarity. This pattern is repeated in the successive radial columns in burst fields A-D (from left to right in FIG. 8).

The servo pattern generated by the servo writing process allows a quadrature signaling to be generated when a read/write head passes over a track of patterned storage media 800. This pattern shown in FIG. 8 has double the radial period compared to a single-track pattern. As a result, offset arrays are not needed to generate quadrature signals. Shifting the pattern of burst fields C and D relative to burst fields A and B by a radial offset equivalent to one row of islands provides the desired offset for quadrature, without having to physically offset the array. Thus, offset arrays are not needed which eliminates any problems of boundaries between the offset arrays and makes fabrication easier. The pattern in FIG. 8 may be desirable for hyper track recording.

The servo writing process in step 704 of FIG. 7 may also be performed to define the polarity of the islands in the synchronization field. The pattern in the synchronization field in FIG. 8 is similar to FIG. 5.

Figure 9:
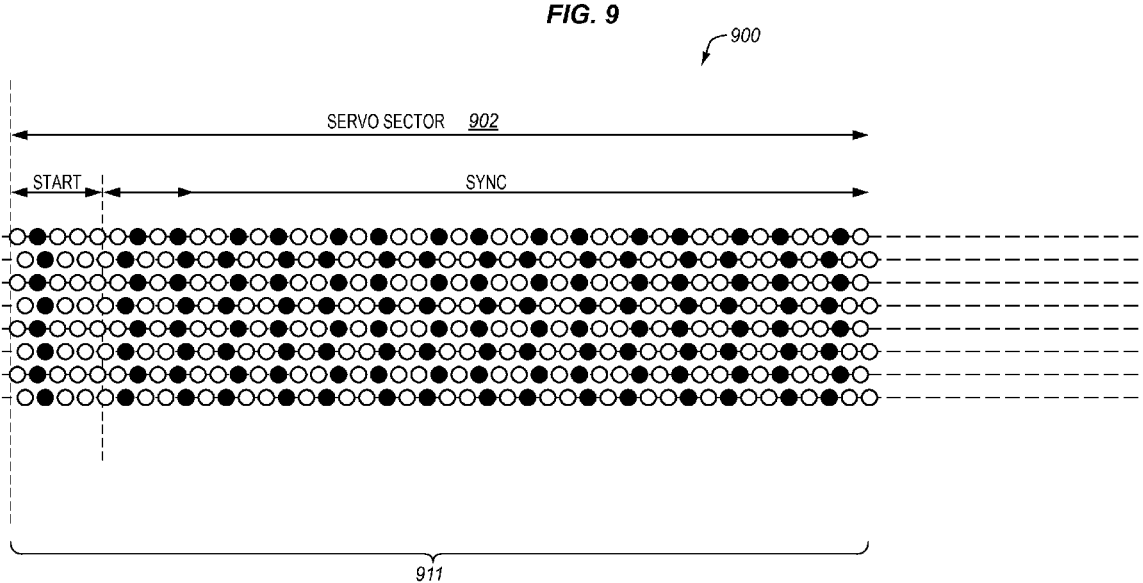
FIG. 9 is a top view of a patterned storage media in an exemplary embodiment of the invention.

The synchronization fields as shown in FIGS. 5 and 8 may have different desired patterns. FIG. 9 is a top view of a patterned storage media 900 illustrating another synchronization field in an exemplary embodiment of the invention. Patterned storage media 900 has an array 911 of islands in servo sector 902. As with the other embodiments, array 911 comprises eight rows of islands that are highly ordered, although array 911 may include many more rows of islands.

To provide the desired synchronization pattern in this embodiment, the polarities of the consecutive islands in a row are defined. For instance, in the first row on FIG. 9 (i.e., the top row in FIG. 9), the servo write process writes a first polarity in an island, writes a second polarity in the next consecutive island, writes the first polarity in the next consecutive island, and writes the second polarity in the next two consecutive islands. This pattern is then repeated along the first row. In the second row, the servo write process writes the first polarity in an island, writes the second polarity in the next two consecutive islands, writes the first polarity in the next consecutive island, and writes the second polarity in the next consecutive island. This pattern is then repeated along the second row.

This process of writing to consecutive rows (going down in FIG. 9) is repeated to define the servo pattern illustrated in FIG. 9. Due to the servo writing process described above, the islands of a first set of two or more consecutive radial columns have the first polarity (indicated by black islands), and a second set of three (or more) radial columns have the second polarity (indicated by white islands). The sequence is then repeated, except that the pattern is shifted by one row (or track). In other words, consecutive instances of the first set of two or more radial columns having the first polarity are shifted by one row.

The synchronization pattern in FIG. 9 provides advantages that the average down track position of the pattern is unchanged regardless of radial position. Although each pair of radial columns having the first polarity follow a zigzag path radially through array 911, the adjacent pair of radial columns having the first polarity has an equal and opposite shift. Thus, the shifts caused by the HCP ordering are cancelled. The signal can be derived from mean position of adjacent pulse pairs. The zigzag pattern in FIG. 9 is over two adjacent radial columns, but the zigzag pattern may be over three radial columns, four radial columns, etc, as long as the synchronization pattern is insensitive to radial position and the shifts caused by the HCP ordering are cancelled. Also, because the radial columns in this servo pattern have the same polarity, a wide write element may be used for the servo writing process which reduces the time needed for the servo writing process, provided that the write margin, or the size of the write bubble along the track is larger than ¼ of the pitch, but smaller than ¾ of the island pitch.

FIG. 9 also illustrates a start field in array 911 that provides a well-defined position to define the phase of the synchronization pattern. The start field may be a simple space as shown in FIG. 9, or may be a complex pattern.

Figure 10:
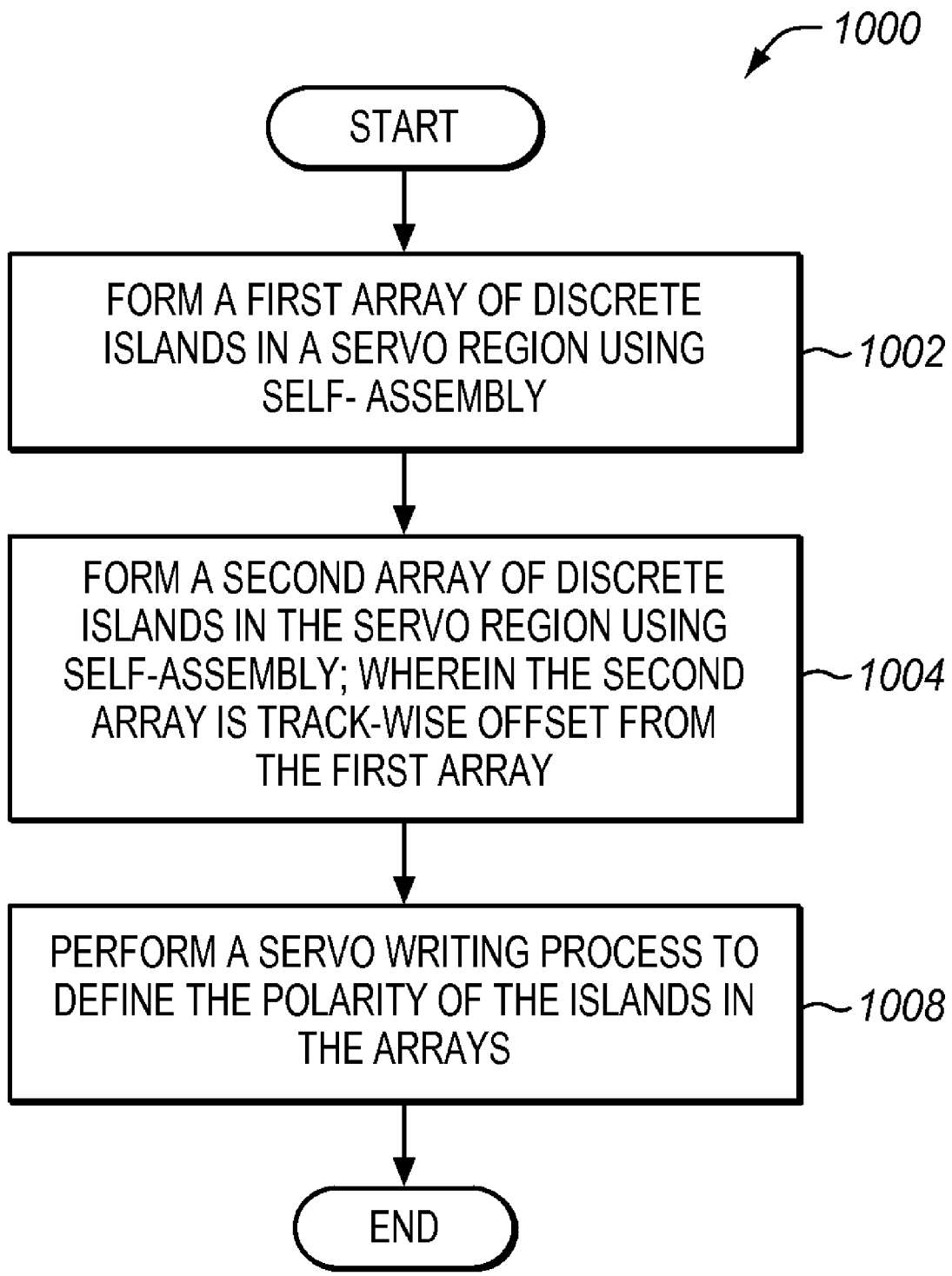
FIG. 10 is a flow chart illustrating another method of fabricating servo sectors of a patterned storage media that is formed with self-assembly in an exemplary embodiment of the invention.

Another variation of the synchronization fields may be used to create a timing-based servo pattern. FIG. 10 is a flow chart illustrating another method 1000 of fabricating servo sectors of a patterned storage media that is formed with self-assembly in an exemplary embodiment of the invention. Although one servo sector is described below, those skilled in the art will appreciate that similar steps may be performed to fabricate multiple servo sectors on a patterned storage media.

Figure 11:
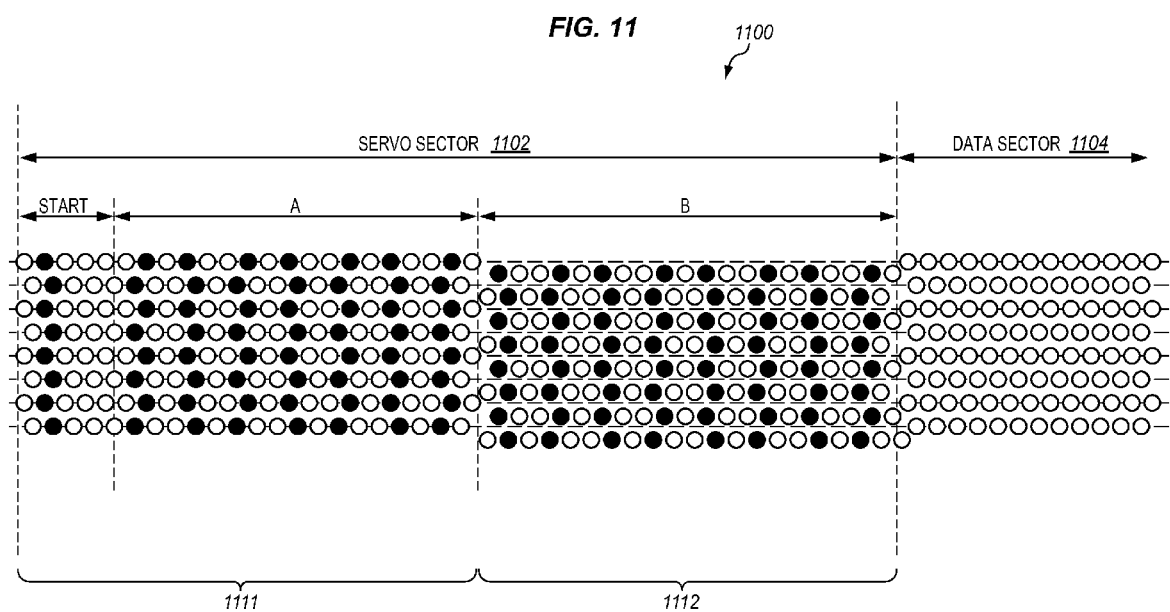
FIG. 11 is a top view of a patterned storage media in an exemplary embodiment of the invention.

Step 1002 comprises forming a first array 1111 of discrete islands in a servo sector 1102 using self-assembly (see FIG. 11). FIG. 11 is a top view of a patterned storage media 1100 in an exemplary embodiment of the invention. Patterned storage media 1100 has a first array 1111 of islands in servo sector 1102. Array 1111 comprises eight rows of islands that are highly ordered (e.g., HCP ordering), although array 1111 may include many more rows of islands. Array 1111 may define one or more burst fields, such as burst field A as illustrated in FIG. 11.

Step 1004 comprises forming a second array 1112 of discrete islands in servo sector 1102 using self-assembly (see FIG. 11). Array 1112 comprises eight rows of islands that are highly ordered (e.g., HCP ordering), although array 1112 may include many more rows of islands. Array 1112 may define one or more burst fields, such as burst field B as illustrated in FIG. 11. Patterned storage media 1100 also includes a data sector 1104 that is shown to illustrate the highly ordered array of islands in data sector 1104 that was also formed with self-assembly. Those skilled in the art will appreciate that arrays 1111 and 1112 may be formed in the same fabrication processes.

Second array 1112 is formed with a track-wise offset (i.e., an offset in the radial direction) from first array 1111. The offset between first array 1111 and second array 1112 may be accomplished using guided self-assembly. The offset shown in FIG. 11 is about a half track offset, as the rows of first array 1111 are substantially on the center of the tracks (the tracks are illustrated as horizontal dotted lines), while the rows of second array 1112 are between tracks. The amount of offset between arrays 1111-1112 may vary depending on design preferences.

As with method 400 shown in FIG. 4, interruption regions may be formed at the boundaries between the offset arrays 1111-1112 to mitigate errors caused by islands positions near the boundaries. Method 1100 may include additional steps of forming other arrays of islands in servo sector 1102 as desired.

Step 1008 comprises performing a servo writing process to define the polarity of the islands in array 1111 and 1112. The servo pattern defined by the servo writing process of step 1008 is substantially similar to the pattern defined in FIG. 9. For instance, in the first row of array 1111 (i.e., the top row in FIG. 11), the servo write process writes a first polarity in an island, writes a second polarity in the next consecutive island, writes the first polarity in the next consecutive island, and writes the second polarity in the next two consecutive islands. This pattern is then repeated along the first row of array 1111. Then, in the first row of array 1112 (i.e., the top row in FIG. 11), the servo write process writes a first polarity in an island, writes a second polarity in the next two consecutive islands, writes the first polarity in the next consecutive island, and writes the second polarity in the next consecutive island. This pattern is then repeated along the first row of array 1112. Then, in the second row of array 1111, the servo write process writes the first polarity in an island, writes the second polarity in the next two consecutive islands, writes the first polarity in the next consecutive island, and writes the second polarity in the next consecutive island. This pattern is then repeated along the second row of array 1111. Then, in the second row of array 1112, the servo write process writes the second polarity in an island, writes the first polarity in the next consecutive island, writes the second polarity in the next consecutive island, writes the first polarity in the next consecutive island, and writes the second polarity in the next consecutive island.

With this servo pattern, the burst fields (A-B) are used to generate a position error signal when read by a read/write head to position the read/write head over the center of a track. Within each array 1111-1112, by measuring the timing between pairs of pulses derived from adjacent pairs of radial columns having the first polarity, the offset relative to track center may be determined. By observing timing in both arrays 1111-1112, a pair of quadrature-locked position signals may be generated.

Figure 12:
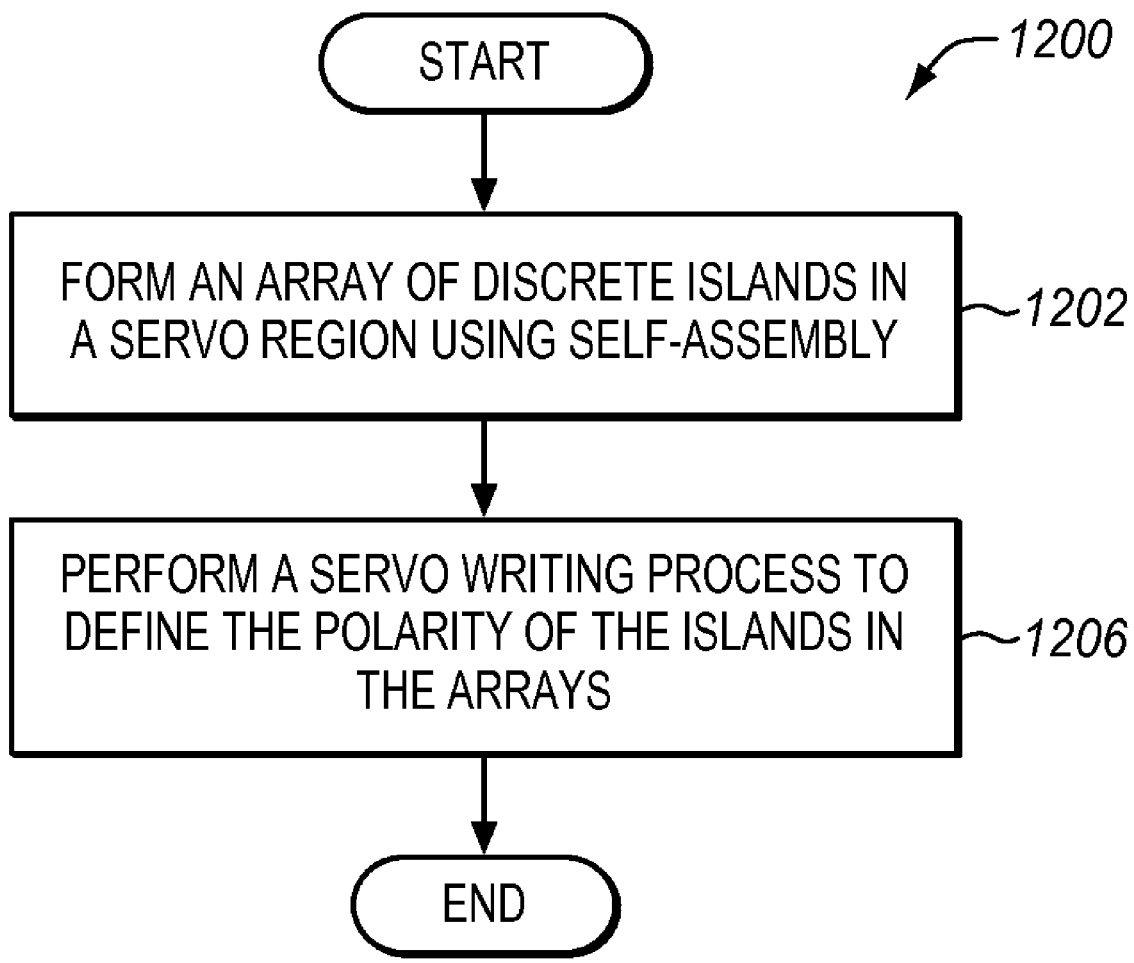
FIG. 12 is a flow chart illustrating another method of fabricating servo sectors of a patterned storage media that is formed with self-assembly in an exemplary embodiment of the invention.

Yet another variation may be used to create a timing-based servo pattern without using offset arrays of islands. FIG. 12 is a flow chart illustrating another method 1200 of fabricating servo sectors of a patterned storage media that is formed with self-assembly in an exemplary embodiment of the invention. Although one servo sector is described below, those skilled in the art will appreciate that similar steps may be performed to fabricate multiple servo sectors on a patterned storage media.

Step 1202 comprises forming an array 1311 of discrete islands in a servo sector 1302 using self-assembly (see FIG. 13). FIG. 13 is a top view of a patterned storage media 1300 in an exemplary embodiment of the invention. Patterned storage media 1300 has an array 1311 of islands in servo sector 1302. Array 1311 comprises eight rows of islands that are highly ordered (e.g., HCP ordering), although array 1311 may include many more rows of islands. Array 1311 may define one or more burst fields, such as burst fields A-B as illustrated in FIG. 13. Patterned storage media 1300 also includes a data sector 1304 that is shown to illustrate the highly ordered array of islands in data sector 1304 that was also formed with self-assembly.

Step 1206 comprises performing a servo writing process to define the polarity of the islands in array 1311. To provide the desired pattern in this embodiment, the polarities of the consecutive islands in a row are defined. For instance, in the first row on FIG. 13 (i.e., the top row), the servo write process writes a first polarity in an island, writes a second polarity in the next three consecutive islands, writes the first polarity in the next consecutive island, and writes the second polarity in the next consecutive island. This pattern is then repeated along the first row in the part A of array 1311. In the second row, the servo write process writes a first polarity in an island, writes a second polarity in the next two consecutive islands, writes the first polarity in the next consecutive island, and writes the second polarity in the next two consecutive islands. This pattern is then repeated along the second row in the part A of array 1311. In the third row, the servo write process writes the second polarity in an island, writes the first polarity in the next consecutive island, writes the second polarity in the next consecutive island, writes the first polarity in the next consecutive island, and writes the second polarity in the next two consecutive islands. This pattern is then repeated along the third row. In the fourth row, the servo write process repeats the pattern of the second row. The same pattern is repeated by the servo write process in part B of array 1311, except that the pattern is shifted down one row.

This process of writing to consecutive rows (going down in FIG. 13) is repeated to define the servo pattern illustrated in FIG. 13. Due to the servo writing process described above, every other island of a radial column 1321 have the first polarity, the islands of a radial column 1322 have the first polarity, every other island of a radial column 1323 have the first polarity, and the islands of the next three radial columns 1324-1326 have the second polarity. This pattern then repeats in part A of array 1311 on the next consecutive radial columns from left to right in FIG. 13. This pattern also repeats in part B of array 1311 on the next consecutive radial columns from left to right in FIG. 13, except that the pattern is shifted downward in FIG. 13.

The pattern in FIG. 13 provides advantages that the average down track position of the pattern is unchanged regardless of radial position. This pattern forms a radial zigzag pattern (or consecutive chevron patterns) of islands having the first polarity (indicated by black islands). The next adjacent radial zigzag pattern of islands having the first polarity has an equal and opposite shift. In other words, consecutive instances of the radial zigzag pattern are inverted. Thus, the shifts caused by the HCP ordering are cancelled. The radial zigzag pattern in FIG. 13 is over three adjacent radial columns, but the zigzag pattern may be over more radial columns in other embodiments.

The timing-based pattern in FIG. 13 does not require a wider read/write head to generate accurate and linear position signals. Because the determination of the position is based on timing rather than amplitude of pulses, it is not necessary for the read/write head to span the full width of a burst or lateral space between bursts. Therefore, the servo pattern is equally useful for both hyper tracks (wide heads) and single tracks (narrow heads). This makes the servo pattern in FIG. 13 attractive for single track recording with the need for offset arrays.

Although specific embodiments were described herein, the scope of the invention is not limited to those specific embodiments. The scope of the invention is defined by the following claims and any equivalents thereof.

We claim:

1. A patterned storage media, comprising:
   servo sectors that are patterned into discrete islands using self-assembly, the servo sectors comprising:
   an array of islands having hexagonal close packed (HCP) ordering;
   wherein the array of islands forms radial columns of islands, and after the islands in the array are written with a servo writing process, a repeating pattern is defined as:
   a first set of two radial columns with each of the two radial columns of the first set comprising islands having a first polarity, where the islands of one of the two radial columns is offset by a track from islands of the other of the two radial columns; and
   a second set of three radial columns with each of the three radial columns in the second set comprising islands having a second polarity opposite the first polarity;
   wherein consecutive instances of the first set of two radial columns are spaced in a track-wise direction by instances of the second set of three radial columns, and have islands that are shifted by one track with respect to islands of an adjacent first set of two radial columns.

2. The patterned storage media of claim 1 wherein the array of islands comprises a first array of islands and a second array of islands that are track-wise offset.

3. A method of fabricating servo sectors of a patterned storage media, the method comprising:
   forming an array of islands having hexagonal close packed (HCP) ordering, wherein the array of islands forms radial columns of islands; and
   performing a servo writing process in the array to define the repeating pattern of:
   a first set of two radial columns with each of the two radial columns of the first set comprising islands having a first polarity, where the islands of one of the two radial columns is offset by a track from islands of the other of the two radial columns; and
   a second set of three radial columns with each of the three radial columns in the second set comprising islands having a second polarity opposite the first polarity;

wherein consecutive instances of the first set of two radial columns are spaced in a track-wise direction by instances of the second set of three radial columns, and have islands that are shifted by one track with respect to islands of an adjacent first set of two radial columns.

4. The method of claim 3 wherein forming an array of islands further comprises:

forming a first array of islands having the HCP ordering; and forming a second array of islands having the HCP ordering that is track-wise offset from the first array of islands.

* * * * *